(12) United States Patent
Reial et al.

(10) Patent No.: US 8,233,427 B2
(45) Date of Patent: Jul. 31, 2012

(54) METHOD AND APPARATUS FOR GENERATING CHANNEL QUALITY ESTIMATES

(75) Inventors: Andres Reial, Malmö (SE); Bengt Lindoff, Bjärred (SE); Anders Rosenqvist, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 347 days.

(21) Appl. No.: 12/392,433

(22) Filed: Feb. 25, 2009

(65) Prior Publication Data

US 2009/0316591 A1 Dec. 24, 2009

Related U.S. Application Data

(60) Provisional application No. 61/074,774, filed on Jun. 23, 2008.

(51) Int. Cl.
 *H04B 7/185* (2006.01)
 *H04B 1/00* (2006.01)
 *H04B 7/00* (2006.01)
 *H04W 4/00* (2009.01)
(52) U.S. Cl. ........... 370/318; 370/333; 455/69; 455/524
(58) Field of Classification Search .................. 370/318, 370/319, 320, 329, 332, 333; 455/134, 135, 455/115.3, 115.1, 226.3, 226.2
See application file for complete search history.

(56) References Cited

U.S. PATENT DOCUMENTS

| 5,710,981 | A  | * | 1/1998 | Kim et al. ........................ 455/69 |
| 6,597,705 | B1 | * | 7/2003 | Rezaiifar et al. ............... 370/468 |
| 7,072,680 | B2 | * | 7/2006 | Lee et al. ........................ 455/522 |
| 7,773,950 | B2 | * | 8/2010 | Wang et al. ................. 455/67.13 |
| 7,801,248 | B2 | * | 9/2010 | Challa et al. ................... 375/316 |
| 7,903,572 | B2 | * | 3/2011 | Kwon et al. ................... 370/252 |
| 2004/0142698 | A1 | * | 7/2004 | Pietraski ..................... 455/452.2 |
| 2007/0082616 | A1 | * | 4/2007 | Bird .............................. 455/63.1 |
| 2007/0082619 | A1 | * | 4/2007 | Zhang et al. ..................... 455/69 |
| 2008/0214198 | A1 |   | 9/2008 | Chen et al. |

FOREIGN PATENT DOCUMENTS

WO 2008135101 11/2008

OTHER PUBLICATIONS

Zhang Z. et al., "A CQI Adjustment Scheme for HSDPA System," IEEE Vehicular Technology Conference 2008 (VTC Spring 2008), May 11-14, 2008, pp. 1433-1437.

* cited by examiner

*Primary Examiner* — Hanh Nguyen
(74) *Attorney, Agent, or Firm* — Coats & Bennett, P.L.L.C.

(57) ABSTRACT

A base station receives channel quality reports from a plurality of mobile terminals. The channel quality reports from the mobile terminals indicate the signal power of the signals received by the mobile terminals from the base station and one or more interference parameters relating to the power of impairment components contributing to the total impairment of the received signal during a first time interval. The base station computes an estimated channel quality indication for a second time interval subsequent to the first time interval based on expected variations in the powers of the impairment components. The estimated channel quality indication for the second time interval is used by the base station to schedule the mobile terminals and to determine the transmission format.

14 Claims, 5 Drawing Sheets

METHOD AND APPARATUS FOR GENERATING CHANNEL QUALITY ESTIMATES

RELATED APPLICATION

This application claims the benefit of U.S. Provisional Patent Application 61/074,774 filed Jun. 23, 2008, which is incorporated herein by reference.

BACKGROUND

The present invention relates generally to channel quality estimation in wireless networks and, more particularly, to a method of generating channel quality estimates for a later time interval based on feedback received from a mobile terminal in an earlier time interval.

High Speed Downlink Packet Access (HSDPA) is a packet data service offered in Wideband Code Division Multiple Access (WCDMA) networks. The HSDPA provides high data rates using enhanced features such as higher order modulation, physical layer hybrid automatic repeat requests, multi-code transmission, fast link adaptation, fast scheduling, and spatial multiplexing.

The physical channel for HSDPA is a time and code multiplexed channel shared by a plurality of mobile terminals. The mobile terminals periodically send channel quality indication (CQI) reports to the base station. The CQI reports indicate the instantaneous channel conditions as seen by the receiver. Based on the CQI reports from the mobile terminals, a scheduler at the base station schedules the downlink transmissions to the mobile terminals and determines the transmission format for the downlink transmissions. The transmission format includes, for example, the transport block size, modulation, and coding, which are selected to achieve a desired error performance. The identity of the mobile terminals scheduled to receive data in a given time interval, and the transmission format, is transmitted to the mobile terminals over a shared downlink control channel.

In HSDPA networks, the channel quality reports are known as channel quality indication (CQI) reports. The CQI report includes a channel quality indication that describes the effective channel quality as perceived by the demodulator in the mobile terminal. The CQI report essentially conveys a standardized measure of the SIR of the received signal after demodulation. The CQI report is sent periodically by the mobile terminal, while the HSDPA connection is active, even when the mobile terminal is not currently receiving data on the shared downlink channel.

While the CQI reports are useful in scheduling transmissions to mobile terminals and selecting the proper transmission format, the interference conditions as seen by the receiver may change between the time that the mobile terminal sends the CQI report to the base station, and the time that the mobile terminal is scheduled to receive a transmission on the downlink. The amount of both own-cell and other-cell interference may change. For example, interference sources present in the time interval when the CQI report is made may no longer be present in the time interval when the mobile terminal is scheduled to receive downlink transmissions. Further, interference sources present in the time interval when the mobile terminal is scheduled to receive downlink transmissions may not have been present in the time interval when the CQI was reported to the base station. These variations in interference sources can result in a mismatch between the selected transmission format and the current channel conditions when the downlink transmissions are made.

In order to still be able to use past CQI reports that have been affected by variations in the instantaneous interference patterns, smoothing may be applied to average out the time varying interference patterns. The use of smoothing means that any fast channel variations are also smeared, which can significantly impede the scheduler's ability to follow instantaneous channel fading for optimal resource allocation.

A related problem is that the mobile terminal itself may apply a certain extent of smoothing to the SIR estimates used to generate the CQI report before mapping the estimated SIR to a corresponding CQI. Smoothing of the SIR estimates is used to reduce the SIR estimation variance. In order to avoid averaging out the channel variations, the smoothing should be limited to a few slots or time intervals, which in itself should be sufficient for handling the channel-related component of the SIR measurement. However, the presence of additional interference requires heavier smoothing in order to reduce the CQI report variance. Again, this reduces the usefulness of the reported CQI values for fast scheduling and efficient resource allocation.

Accordingly, a CQI reporting method is still needed that allows the scheduler to obtain a better estimate of the channel quality experienced by a mobile terminal in the time interval when the downlink transmissions to the mobile terminal are made.

SUMMARY

The present invention relates generally to scheduling of mobile terminals to receive transmissions on a shared downlink channel. The mobile terminals periodically provide a channel quality report to a serving base station. The channel quality report includes the signal power of a received signal and one or more interference parameters contributing to the total impairment of the received signal at a first time interval. The base station computes a channel quality indication for a subsequent time interval based on the signal powers and interference parameters reported by the mobile terminals in the channel quality reports. The computed channel quality indication for the second time interval is used by the scheduler at the base station to schedule mobile terminals and to determine the transmission format.

DETAILED DESCRIPTION

Figure 1:
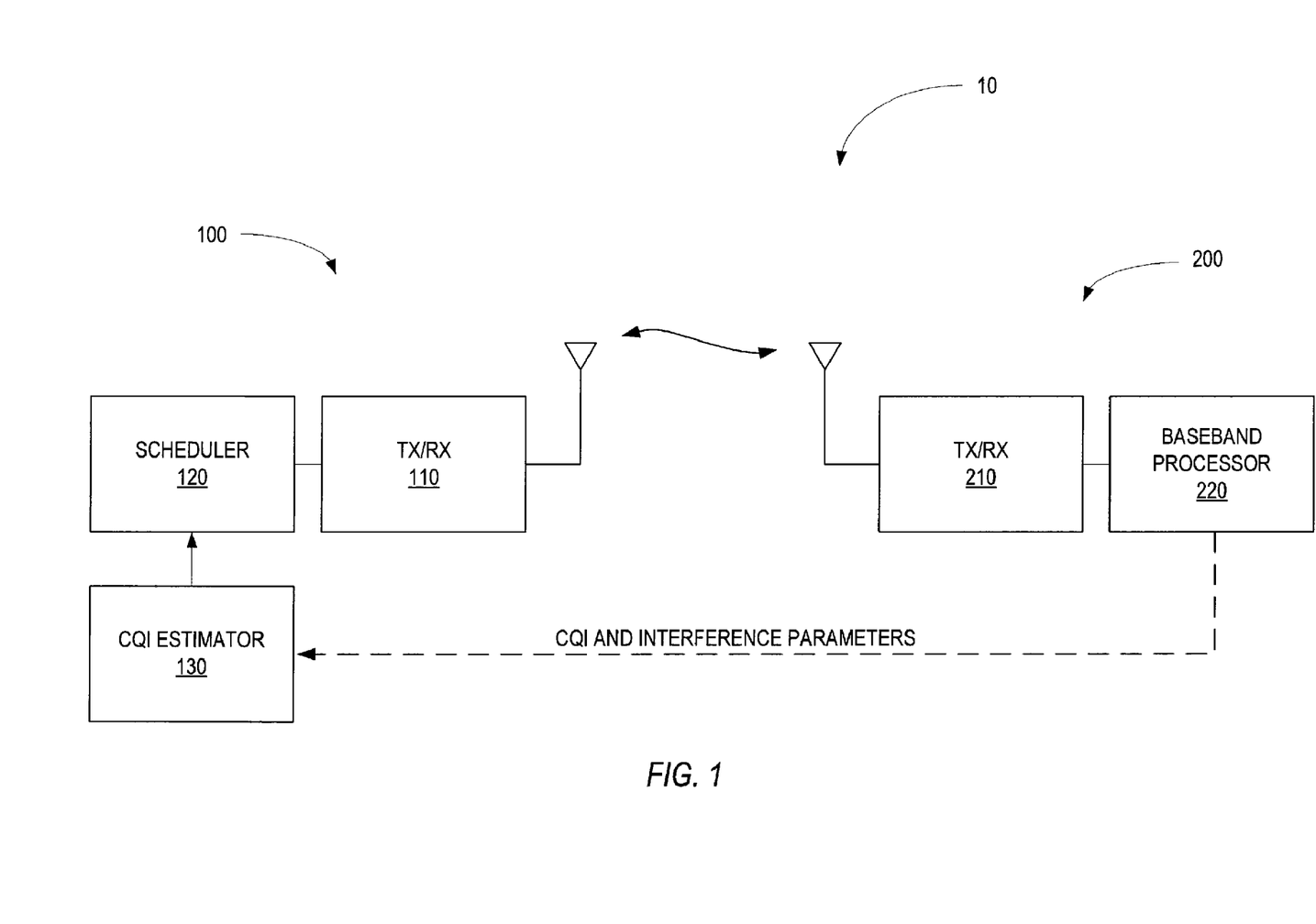
FIG. 1 illustrates an exemplary wireless communication network.

FIG. 1 schematically illustrates an exemplary wireless communication network 10. In the exemplary embodiment described herein, wireless communication network 10 comprises a Wideband Code Division Multiple Access (WCDMA) network. It should be appreciated, however, that the present invention may also be used in other types of networks using other access technologies, such as the Long- Term Evolution (LTE) network that is currently being developed by the 3$^{rd}$ Generation Partnership Project (3GPP). Therefore, the exemplary embodiments described herein should not be construed as limiting.

Wireless communication network 10 includes at least one base station 100 for communicating with a plurality of mobile terminals 200. In the WCDMA/LTE standards, the base station 100 is called a node B (NB) or an enhanced node B (eNB). However, the generic term "base station" 100 is used in this application. The mobile terminal 200 may, for example, comprise a cellular telephone, a personal digital assistant, a laptop computer, or any other device for communicating over a wireless network 10.

For high speed downlink packet access (HSDPA), base station 100 includes a transceiver 110 for transmitting data to the mobile terminals 200 over a shared downlink channel. The downlink channel is divided into a plurality of time intervals called transmission time intervals (TTIs). A scheduler 120 at the base station 100 chooses one or more mobile terminals 200 to receive data during each TTI based on channel quality feedback from the mobile terminals 200. Each mobile terminal 200 includes a transceiver 210 for communicating with the base station 100 and a baseband processor 220 to process signals transmitted to and received by the mobile terminal 200. The mobile terminals 200 estimate the current channel conditions based on pilot signals transmitted by the base station 100 and report those channel conditions to the base station 100. For example, the mobile terminals 200 may estimate the signal-to-interference ratio (SIR) of the downlink channel, map the estimated SIR to a corresponding channel quality indication (CQI), and transmit a CQI report including the computed CQI to base station 100. The CQI reports indicate the instantaneous channel conditions as seen by the receiver in the mobile terminals 200. Based on the CQI reports from the mobile terminals 200, the scheduler 120 within the base station 200 schedules the downlink transmissions to the mobile terminals 200 and determines the transmission formats for the downlink transmissions. The transmission format includes, for example, the transport block size, modulation, and coding which are selected to achieve a desired error performance rate under the reported channel conditions. The identity of the mobile terminals 200 scheduled to receive data in a given time interval, and the transmission format, are transmitted to the mobile terminals 200 over a shared downlink control channel.

The CQI reports sent by the mobile terminals 200 to base station 100 reflect the interference patterns present at the time that the SIR measurements were made by the mobile terminal 200. One problem with CQI reporting is that the CQI represents a condensed measure of the current channel conditions, which are affected by numerous factors including the channel strength, channel dispersion, other cell interference, mobile terminal receiver impairments and noise levels, and mobile terminal receiver type and interference suppression capability. The interference patterns may change between the time that the CQI report is transmitted and the time that a mobile terminal 200 is scheduled to receive a downlink transmission on the downlink traffic channel. Variations in the interference patterns may result in a mismatch between the selected transmission format and the current channel conditions when the downlink transmissions are sent to a mobile terminal 200 in a subsequent TTI. If the interference conditions worsen, the receiver at the mobile terminal 200 may see a sharp increase in the error rate. On the other hand, if the interference conditions improve, base station 100 may transmit data at a lower rate than can be supported by the channel, resulting in a waste of bandwidth.

According to various embodiments of the present invention, mobile terminal 200 provides base station 100 with information about individual impairment components that contribute to the total impairment at the receiver. The mobile terminal 200 may also provide base station 100 with information indicating the receiver type and interference suppression capability of the mobile terminal 200. In some embodiments, the information about individual impairment components and receiver type may be transmitted along with the conventional CQI estimate in the CQI report. In other embodiments, the CQI report may include information about the individual interference components. With additional information about the impairment and receiver type, the base station 100 is able to estimate the channel with greater accuracy during a TTI when a mobile terminal 200 is scheduled to receive transmissions on the downlink channel. That is, base station 100 may use the information about interference present in a first TTI to synthesize an estimate of the channel conditions during a subsequent TTI of interest when the mobile terminal 200 is scheduled to receive transmissions.

In a conventional WCDMA system, the CQI reported by mobile terminal 200 is a function of the estimated SIR seen by the mobile terminal 200 and some receiver mode parameters. In general, the mobile terminal 200 estimates the SIR and maps the estimated SIR to a corresponding CQI value that is transmitted to the base station 100 in the CQI report. The estimated SIR is a function of the relative strengths of the desired signal S and the impairment signals $I_k$ that act as interference. The SIR may be given by:

$$SIR = \frac{S}{\sum_k I_k}. \quad \text{Eq. 1.}$$

A non-exhaustive listing of the impairment components that contribute to the total impairment seen by mobile terminal 200 includes own-cell interference $I_{own}$, other-cell interference $I_{other}$, receiver impairment $I_{rx}$ due to imperfect processing by the mobile terminal 200, receiver noise impairment $I_{noise}$, and impairment due to the non-orthogonal sync channel $I_{sync}$. These various impairment components may be modeled as:

$$I_1 : I_{own} = \rho_0 P_{BS,0} \quad \text{Eq. 2}$$

$$I_2 : I_{other} = \sum_{n=1}^{N} \rho_n P_{BS,n} \quad \text{Eq. 3}$$

$$I_3 : I_{rx\_fe} = \lambda \sum_{n=0}^{N} P_{BS,n} \quad \text{Eq. 4}$$

$$I_4 : I_{rx\_noise} = N_0 \quad \text{Eq. 5}$$

$$I_5 : I_{SCH\_own} = \nu P_{SCH,0} \quad \text{Eq. 6}$$

In Equations 2-6, $P_{BS,n}$ is the power allocation for the n$^{th}$ neighboring base station 100 contributing to the total interference, and the variables $\rho_0$, $\rho_n$, $\lambda$, and $\nu$ are scaling parameters reflecting the sensitivity of the channel estimation to different interfering signals.

If mobile terminal 200 reports the impairment components in Eqs. 2-6 separately, the scheduler 120 at base station 100 can estimate the SIR that is expected in a TTI of interest that takes into account expected variations in the impairment components. For example, the base station 100 may receive scheduling information from neighboring base stations 100. Based on the scheduling information received from neighboring base stations, the serving base station 100 may determine that an impairment source present when the CQI was reported by the mobile terminal 200 will change. Using a model of the impairments seen by the mobile terminal 200, the serving base station 100 can estimate the SIR that is expected in the TTI of interest based on the expected changes in the interference conditions. The estimation process can be improved if the base station 100 is aware of the interference suppression capability of the mobile terminal 200. Thus, the model used by base station 100 to estimate the SIR at a time interval of interest may incorporate information about the receiver type of the mobile terminal 200.

In some embodiments of the invention, the mobile terminals 200 may feed back the individual component powers $I_k$ of the impairment components to the base station 100. If the component powers $I_k$ for the various impairment components are known, base station 100 may deduce the relevant scaling parameters for each impairment component and account for expected variations in the power of the impairment components during the TTI of interest. In other embodiments of the invention, the serving base station 100 may receive information about power allocations $P_{BS,n}$ in the neighboring cells. In this case, base station 100 may compute the estimated SIR for a TTI of interest from the scaling parameters $\rho_0$, $\rho_n$, $\lambda$, and $\nu$, which are fed back from the mobile terminal 200. The scaling parameters provide information to the base station 100 about the relative powers of various impairment components. Using a model of the impairments and the scaling parameters fed back from the mobile terminal 200, the base station 100 can compute an estimated SIR for a time interval of interest.

As previously noted, the model of the impairments used by the base station 100 to compute the SIR for a TTI of interest may take into account the receiver's capability to suppress different types of interference. For example, a GRAKE receiver typically suppresses own-cell interference and a GRAKE2+ receiver may suppress other-cell interference in addition to own-cell interference. Therefore, in some embodiments of the present invention, base station 100 may be provided with information about the receiver type and/or the interference suppression capability of the receiver used in the mobile terminal 200. Using knowledge of the receiver type in the estimation of the SIR for a TTI of interest improves the accuracy of the SIR estimate.

The receiver type information may be included in the CQI report sent from mobile terminal 200 to the base station 100. Because the receiver type will not change during the course of a communication session, it may be sufficient to send the receiver type information infrequently or only once, such as at the time the communication is set up with the mobile terminal 200.

In some embodiments of the invention, information about different impairment components may be reported by the mobile terminal 200 to the base station 100 at different update rates. For example, mobile terminal 200 may report the own-cell interference $I_1$ and other-cell interference $I_2$ in every reporting interval. Other impairment components that change more slowly or less frequently may be reported with a lower frequency. Further, as noted above, the receiver type may be reported only once or very infrequently.

To help in understanding the invention, a few examples are given below. These examples assume that the SIR for the TTI of interest is modeled by the base station 100 as shown in Eqs. 1-6.

EXAMPLE #1

The mobile terminal 200 reports the receive signal strength S, the own-cell interference $I_1$, and the other-cell interference $I_2$ in every TTI using layer 1 (L1) signaling. The receiver impairment $I_3$ or its corresponding scaling parameter $\lambda$, and receiver noise impairment $I_4$ are sent from the mobile terminal 200 to the base station 100, along with the receiver type at connection set up or infrequently using higher layer signaling. If the base station 100 expects a change in one of the interference components $I_k$, the base station 100 can account for this change in the computation of the SIR for the time interval of interest.

EXAMPLE #2

In this embodiment, mobile terminal 200 reports the receive signal strength S along with the own-cell interference $I_1$, every TTI using layer 1 signaling. The mobile terminal 200 also reports the other-cell interference $I_{2,n}$ separately for each neighboring base station n. The other-cell interference $I_{2,n}$ is reported every TTI via layer 1 signaling. The receiver impairment $I_3$ and the receiver noise impairment $I_4$ along with the receiver type, may be reported at connection set up or infrequently via higher layer signaling. In this example, the base station 100 models the other cell interference separately for each neighboring base station to generate a more accurate estimate of the SIR.

EXAMPLE #3

In this embodiment, mobile terminal 200 computes and reports the CQI value as done in the prior art. Additionally, the mobile terminal 200 reports the relative powers $I_k$ of the different impairment components, or their corresponding scaling parameters, with varying update rates. The relative powers of the impairment components $I_k$, or the corresponding scaling parameters, can be reported via L1 signaling. The base station 100 computes the SIR for a TTI of interest, maps the computed SIR to a corresponding CQI, and compares the computed CQI to the CQI reported by the mobile terminal 200. To determine the transmission format, the base station 100 may use either the computed CQI or the reported CQI to schedule the mobile terminal 200 and to select the transmission format. The selection of the computed CQI and the reported CQI can be based on a comparison between the computed CQI and the reported CQI. For example, base station 100 may compare the difference between the current reported CQI and the computed CQI to a predetermined threshold. If the variation is greater than the threshold, indicating a model error, base station 100 may use the reported CQI from an earlier TTI. On the other hand, if the difference is less than the threshold, indicating a small variation, the base station 100 may use the computed CQI, where the CQI value is synthesized based on the earlier interference condition and the changes from that condition known to the base station 100.

A large number of alternative embodiments based on the reporting of different combinations of interference parameters can be envisioned. Also, different models of the impairment seen by the receiver can be used. Therefore, the examples given above should be considered as illustrative and not limiting.

In certain types of receivers, such as a parametric GRAKE receiver, the signal and interference power values, and/or other scaling parameters of interest, are already available since these same parameters are used in the computation of the combining weights. In GRAKE receivers that do not use the parametric approach, the relative powers of different impairment components may be derived using a simplified GRAKE parameter fitting process.

Figure 2:
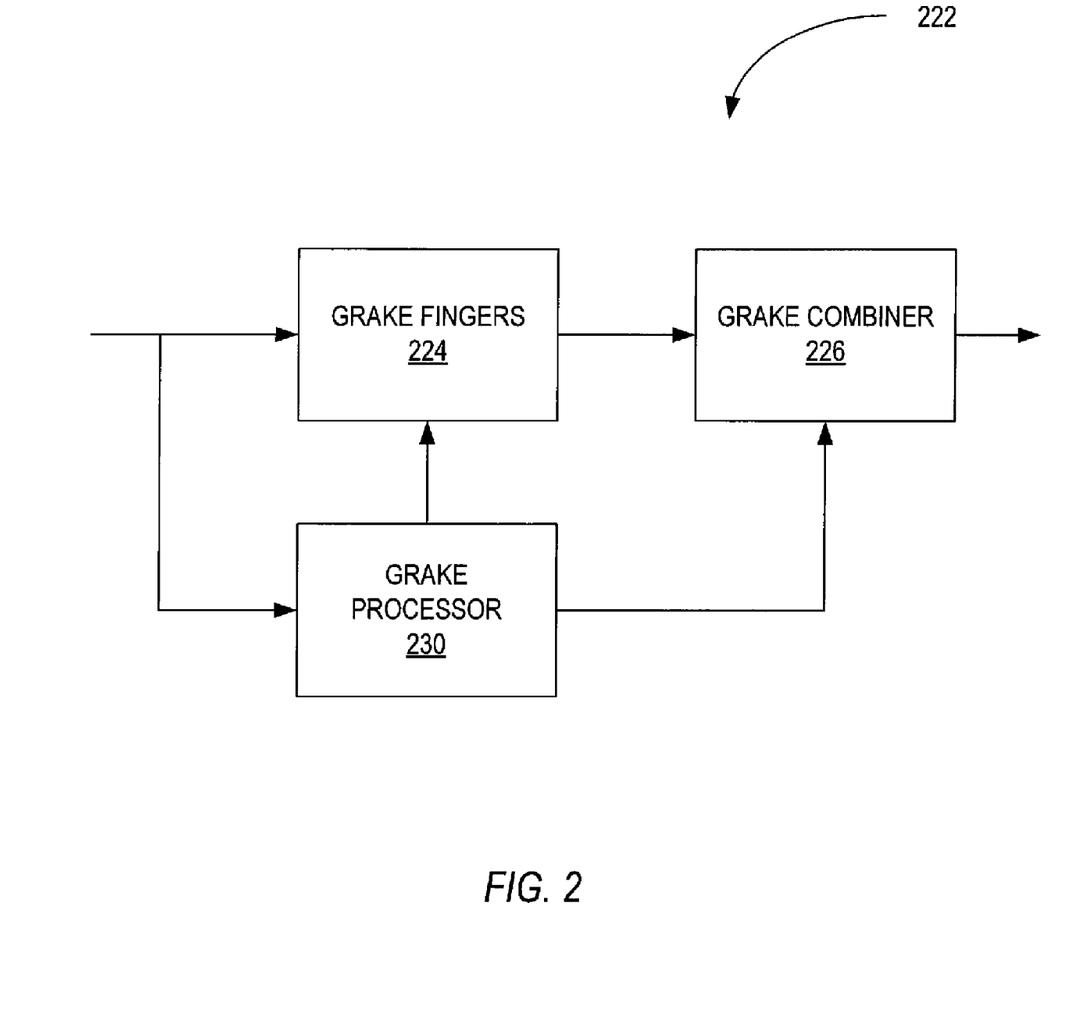
FIG. 2 illustrates an exemplary GRAKE receiver in a mobile terminal.

FIG. 2 illustrates an exemplary GRAKE receiver 222 for a WCDMA communication network, which may be implemented within the baseband processor 220 of a mobile terminal 200. GRAKE receiver 222 comprises a plurality of GRAKE fingers 224, a GRAKE combiner 226, and a GRAKE processor 230. The GRAKE fingers 224 despread a received signal r to generate despread values for a symbol of interest, represented in vector form as y. Similarly, despread values are produced for pilot symbols represented in vector form as $y_p$. GRAKE combiner 226 combines the despread values y from the GRAKE fingers 224 to generate a GRAKE combined value z. GRAKE processor 230 determines finger delays τ for the GRAKE fingers 224 and computes a combining weight vector w used by the GRAKE combiner 226 to combine the despread symbol values y. In computing the combining weight vector w, the GRAKE processor 230 uses the impairment covariance to suppress interference in the GRAKE combined values z.

Figure 3:
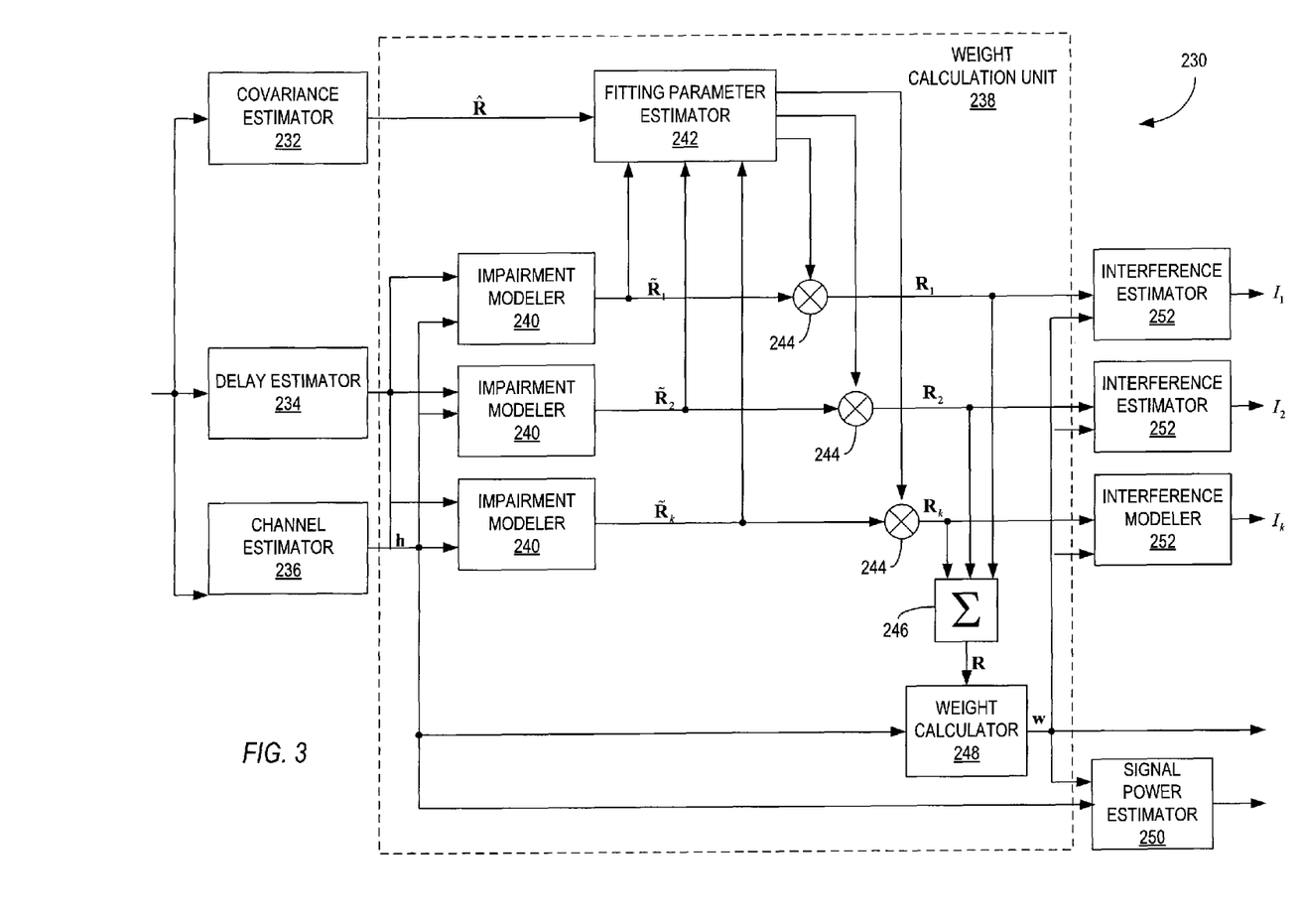
FIG. 3 illustrates an exemplary GRAKE processor for a parametric GRAKE receiver.

In one exemplary embodiment, as shown in FIG. 3, GRAKE processor 230 uses a parametric model of the total impairment covariance to compute the GRAKE combining weight vector w. An impairment covariance matrix R is modeled as a weighted sum of component covariance matrices $R_k$ and a noise covariance matrix $R_n$ as shown below:

$$R = \sum_{k=0}^{K} \rho_k R_k. \qquad \text{Eq. 7}$$

In the above model, $R_k$ is the covariance matrix for the $k^{th}$ impairment term and $\rho_k$ is a fitting parameter for the $k^{th}$ impairment term The fitting parameters $\rho_k$ may be estimated by measuring the impairment covariance R on the common pilot channel and adjusting the fitting parameters $\rho_k$ to fit the parametric model given by Eq. 7 to the measured impairment covariance R. A least squares (LS) fitting process may be used to estimate the fitting parameters $\rho_k$.

The combining weight vector w for a GRAKE receiver 222 may be computed according to:

$$w = R^{-1}h, \qquad \text{Eq. 8}$$

where h is the channel response vector corresponding to the pilot channel. The SIR of the channel can be computed based on the combining weights w according to:

$$SIR = \frac{S}{I} \qquad \text{Eq. 9}$$

where $$S = |w^H h|^2 \qquad \text{Eq. 10}$$

and $$I = w^H R w. \qquad \text{Eq. 11}$$

Note that Eq. 11 gives power of the total impairment. The individual component powers of the impairment components that contribute to the total impairment can be computed according to:

$$I_k = w^H \alpha_k R_k w, \qquad \text{Eq. 12}$$

where $\alpha_k$ is a scaling parameter that reflects the relative contribution of the impairment component to the total impairment seen by the mobile terminal 200.

FIG. 3 illustrates in more detail the processing performed by the GRAKE processor 230 in the exemplary parametric GRAKE receiver 222. GRAKE processor 230 includes a co-variance estimator 232, delay estimator 234, channel estimator 236, and weight calculation unit 238. Co-variance estimator 232 generates a rough estimate $\hat{R}$ of the total impairment co-variance R based on measurements made on the common pilot channel. Delay estimator 234 determines the finger delays $\tau_i$ for each of the GRAKE fingers 224 as known in the art. Channel estimator 236 determines the channel estimates h for the channel between the base station 100 and the mobile terminal 200 based on a pilot signal transmitted from the base station 100. The rough co-variance estimate $\hat{R}$, finger delays $\tau_i$, and channel estimates h are input to the weight calculation unit 238. Weight calculation unit 238 uses a parametric fitting process to compute a final estimate R of the total impairment co-variance from the noisy co-variance estimate $\hat{R}$. The final co-variance estimate R is then used to compute the combining weights w for the GRAKE combiner 226.

The weight calculation unit 238 includes a plurality of impairment modelers 240, a fitting parameter estimator 242, scaling units 244, summing unit 246, and weight calculator 248. Impairment modelers 240 model the various impairment components contributing to the total impairment seen by the mobile terminal 200 based on the finger delays and channel estimates h from the delay estimator 234 and channel estimator 236, respectively. The impairment modelers 240 output modeled covariance estimates $\{\tilde{R}_1, \tilde{R}_2, \ldots, \tilde{R}_k\}$ for the individual impairment components to the fitting parameter estimator 242. The fitting parameter estimator 242 uses the modeled covariance estimates $\{\tilde{R}_1, \tilde{R}_2, \ldots, \tilde{R}_k\}$ from the impairment modelers 240 and the noisy covariance estimate $\hat{R}$ from the co-variance estimator 232 to determine the fitting parameters $\rho_k$ for each modeled impairment term. Scaling units 244 scale each of the modeled impairment terms output from the impairment modelers 240 by corresponding fitting parameters $\rho_k$ generated by the fitting parameter estimator 242 to generate weighted covariance estimates $\{R_1, R_2, \ldots, R_k\}$ for each of the impairment components. Combiner 246 combines the weighted impairment terms $\{R_1, R_2, \ldots, R_k\}$ to generate a final total covariance estimate R that is provided to the weight calculator 248. Weight calculator 248 then computes combining weights w according to Eq. 8 based on the total impairment co-variance R and the channel estimates h. These combining weights w are provided to the RAKE combiner 226.

The GRAKE processor 230 may further include one or more interference power estimators 252, and signal power estimator 250. The interference power estimators 252 compute the interference power $I_k$ of each impairment component from the weighted covariance estimates $\{R_1, R_2, \ldots, R_k\}$ output from the scaling units 244 and the combining weights w output from the weight calculator 248 according to Eq. 11. The signal power estimator 250 computes the received signal power S according to Eq. 9 from the combining weights w output from the weight calculator 248 and the channel estimates h from the channel estimator 236.

The information generated by the GRAKE receiver as shown in FIGS. 2 and 3 is used in CQI reporting. The post-equalization residual interference power for the various impairment components may be estimated by evaluating the interference powers corresponding to the different interference sources one by one. The component powers for each of the individual impairment components may be computed according to Eq. 11. These values may then be reported to the base station 100 as part of the CQI report, along with the signal strength S.

The following is a more detailed example of how interference parameters may be used in CQI reporting and scheduling. This example assumes a serving base station 100 having a single neighboring cell acting as an interferer. The mobile terminal 200 uses a GRAKE receiver 222 as shown in FIGS. 2 and 3. The co-variance of the own-cell interference at time t is denoted $R_1$ and the co-variance of the interference from the neighboring cell is denoted $R_2$. These co-variances may be estimated by parametric modeling as described above. For simplicity in the description, it is assumed that $N_o$=0 (or negligible). It is also assumed that the mobile terminal 200 reports the following quantities at a first-time interval t.

The traditional CQI value describing the actual current interference situation. The traditional CQI value is computed by estimating the SIR and mapping the estimated SIR to a corresponding CQI value.

The signal power S and own-cell interference power $I_1$ when interference suppression is applied in the absence of the other-cell interference $I_2$. The signal power S and own-cell interference power $I_1$ may be computed according to Eq. 9 and 11.

Instantaneous other-to-own-cell interference power ratio Q without interference suppression. The other to own cell interference power ratio may be given by:

$$Q = \frac{tr[R_2]}{tr[R_1]}. \qquad \text{Eq. 12}$$

These parameters are sent by the mobile terminal 200 to the base station 100 in a CQI report every TTI using layer 1 signaling.

Base station 100 receives the periodic CQI reports from the mobile terminal 200. The base station 100 may compute the SIR for a later time interval t+T, which is typically a few TTIs later, based on the interference parameters provided by the mobile terminal 200. For example, base station 100 may compute the $SIR^{t+T}$ at time t+T and map the computed $SIR^{t+T}$ to a corresponding $CQI^{t+T}$ according to a mapping function $SIR^{t+T} \rightarrow CQI^{t+T}$. The $SIR^{t+T}$ at time t+T may be computed according to:

$$S\hat{I}R^{t+T} = \frac{S}{I_1\left[1 + F_l\left(\frac{P_2^{t+T}}{P_2^u} \frac{P_1^u}{P_1^{t+T}}Q\right)\right]}. \qquad \text{Eq. 13}$$

In Eq. 13, $P_1^u$ is the power transmitted (or to be transmitted) by the serving base station 100 at time u and $P_2^u$ is the power transmitted (or to be transmitted) by the interfering base station 100 at time u, which is assumed to be known to the scheduler 120. The function $F_l$ is a function to account for the interference suppression capability of the mobile terminal 200.

The function $F_l$ provides a scalar coefficient describing the impact of the other-cell interference as a fraction of the own-cell interference. In the simplest cases, e.g., both own- and other-cell interference components being white, $F_l(x)=x$. However, a practical receiver computes the combining weights w as a trade-off between signal energy collection and own- and other-cell interference suppression. Thus, the post-combining signal power and interference power is determined by the instantaneous relationship of a large number of parameters and the previous combining weights w may not yield accurate estimates in a changed interference scenario. The function $F_l$ compensates for this mismatch. The shape of the true $F_l$ depends on the interference suppression capability of the receiver, the channel realization, etc. However, in practice, a limited number of pre-tabulated functions $F_l$ may suffice to provide a close match. The proper function (table) $F_l$ is chosen by the serving base station 100 based on the mobile terminal 200 receiver type information and the channel profile information available from the UL receiver (e.g., the path searcher). The correctness of the model selection may be verified by computing $SIR^t$ based on the signal and own-cell interference powers reported by the mobile terminal 200, mapping $SIR^t$ to a corresponding $CQI^t$ and comparing $CQI^t$ to the $CQI^{rep}$ reported by the mobile terminal at time t. The $SIR^t$ may be computed according to:

$$S\hat{I}R^t = \frac{S^{own}}{I_1[1 + F_l(Q)]}. \qquad \text{Eq. 14}$$

The examples given herein are meant to illustrate details of extracting and applying relevant interference parameters to enable more accurate CQI estimation at the base station 100. As noted previously, numerous implementations of the present invention are possible using different models of the impairment and relying on feedback of different interference parameters.

While the scaling parameters $\rho_m$, $N_0$, reflect the interference component powers prior to equalization, the minimum mean square error (MMSE) criteria applied by the GRAKE allows the relative suppression to be roughly approximated as proportional to the fitting parameters $\alpha_k$. Thus, the fitting parameters $\alpha_k$ computed by the fitting parameter estimator 242 may be used to estimate the relative powers of the interference components $I_k$ after equalization. This approach would preferably use representations of the component co-variance matrices $R_k$ and $R_n$ that are normalized to unit norm.

Figure 4:
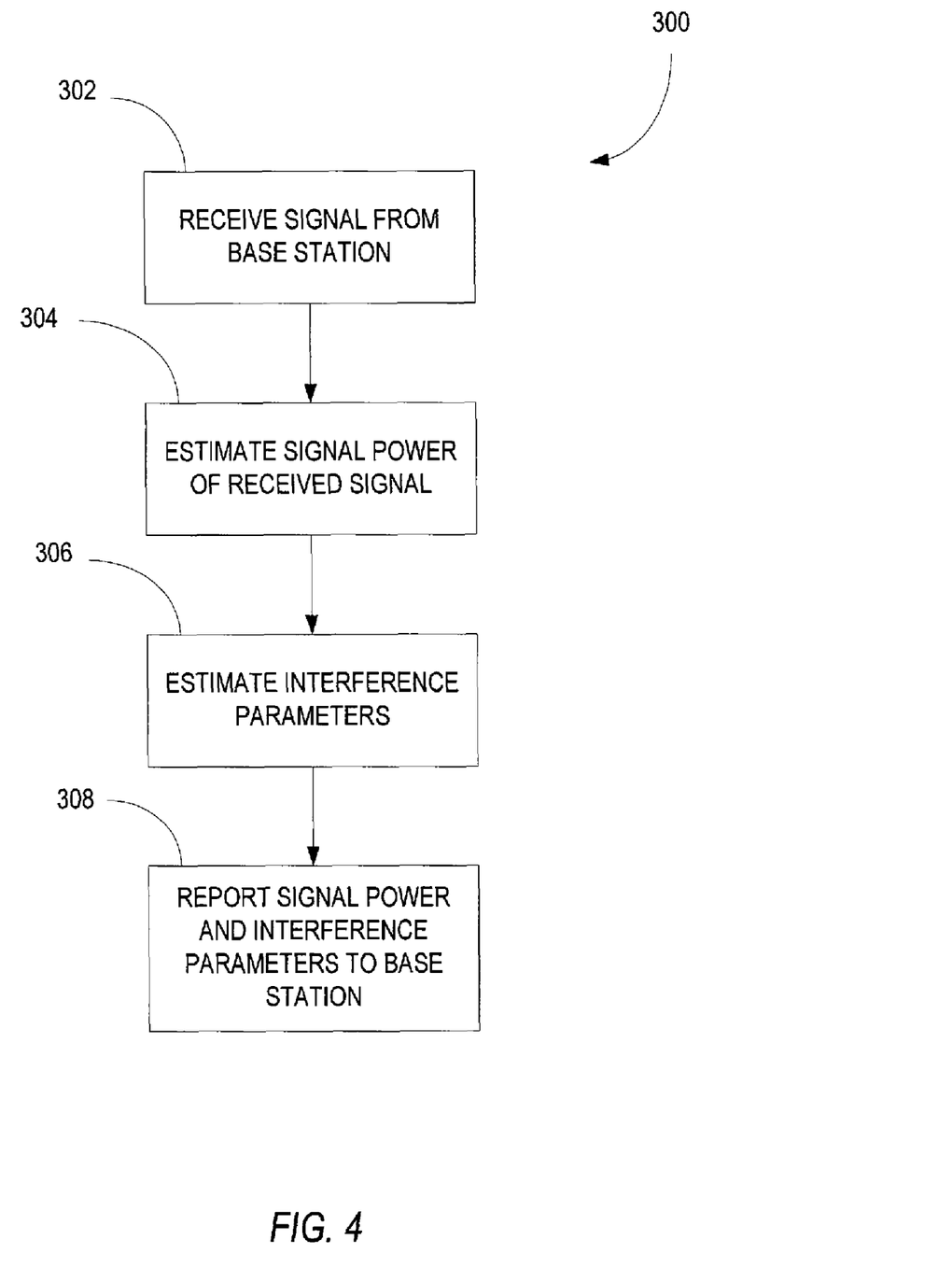
FIG. 4 illustrates an exemplary method implemented by a mobile terminal for providing channel quality feedback to a serving base station.

FIG. 4 illustrates an exemplary method 300 implemented by a mobile terminal 200 for reporting interference parameters, which may be sent as part of a CQI reporting process. The mobile terminal 200 receives a signal from the base station 100 (block 302). At a predetermined reporting interval (for instance, once per TTI), the mobile terminal 200 estimates the received signal power S (block 304), and one or more interference parameters (block 306). The interference parameters may comprise the component powers $I_k$ of the individual impairment components contributing to the total impairment, or their corresponding scaling parameters $\rho_o$, $\rho_n$, $\lambda$, and $v$, or a combination thereof. The mobile terminal 200 then sends a CQI report to the base station 100 including the received signal power S and the interference parameters (block 308).

Figure 5:
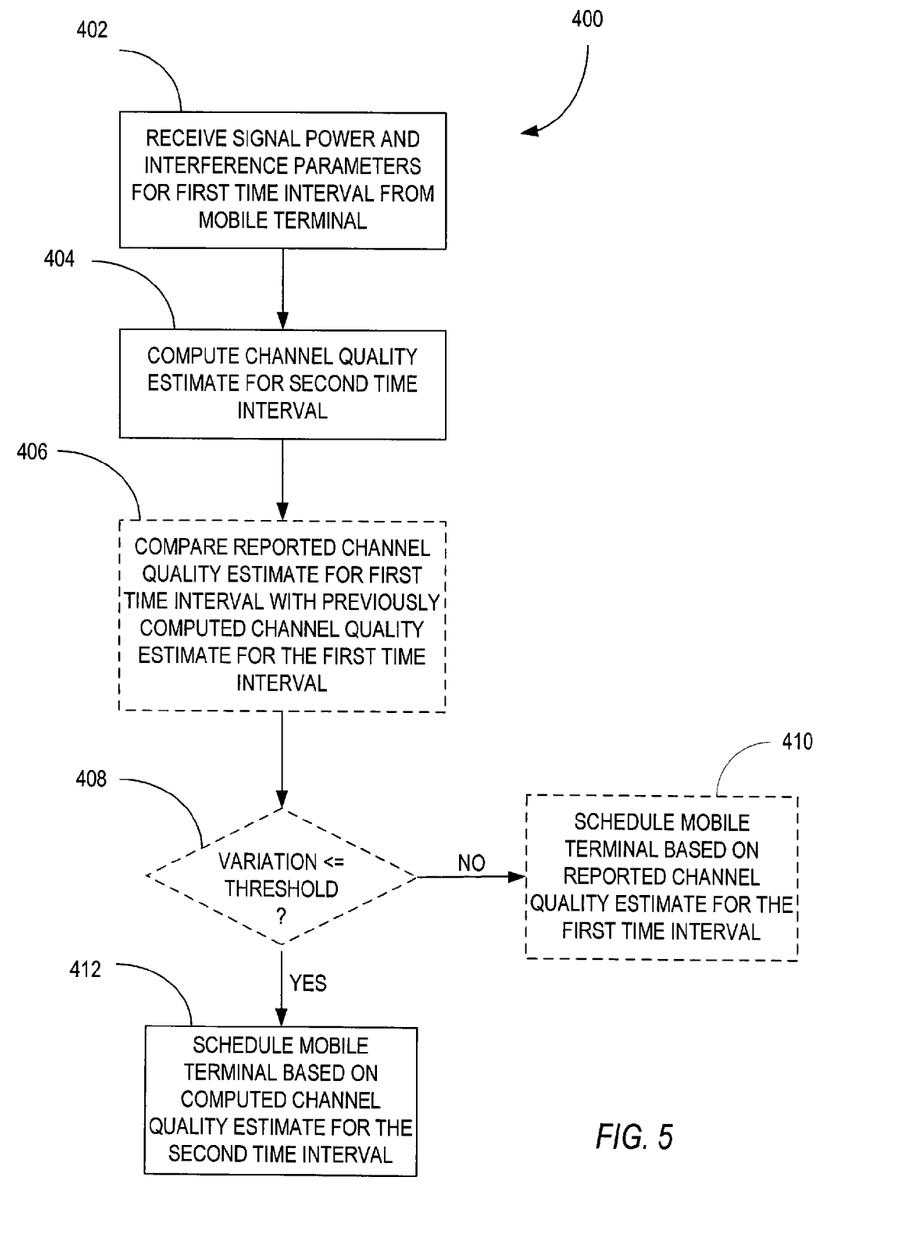
FIG. 5 illustrates an exemplary method implemented by a serving base station for scheduling a mobile terminal on a shared downlink channel.

FIG. 5 illustrates an exemplary method 400 implemented by the base station 100. The base station 100 receives channel quality feedback from a mobile terminal 200, which includes the signal power and one or more interference parameters for a first time interval (block 402). The channel quality report may, in some embodiments, also include a reported channel quality estimate (e.g., CQI). The interference parameters relate to the power of one or more impairment components contributing to the total impairment seen by the receiver in the mobile terminal 200 during a first time interval. Based on the signal power and interference parameters fed back from the mobile terminal 200, the base station 100 computes a channel quality estimate for a second time interval of interest, which is subsequent to the first time interval (block 404). As noted above, the second time interval is typically the time interval when the mobile terminal 200 is scheduled to receive data on the downlink channel and is usually several TTIs following the first time interval. In some embodiments, the base station 100 may compare the reported channel quality estimate for the first time interval received from the user terminal 200 with a previously computed channel quality estimate for the first time interval (block 406). The previously computed channel quality estimate for the first time interval computed based on signal power and interference parameters received by the base station 100 prior to the first time interval could be temporarily saved for purposes of making the comparison. For example, the base station 100 may calculate a difference between the previously computed channel quality estimate for the first time interval and the reported channel quality estimate for the first time interval. If the variation (e.g., difference) between the computed channel quality estimate and the reported channel quality estimate exceeds a predetermined threshold (block 408), the base station 100 may schedule the mobile terminal 200 for the second time interval based on the reported channel quality estimate for the first time interval (block 410). One the other hand, if the reported channel quality estimate is within the predetermined threshold (block 408), the base station 100 may schedule the mobile terminal 200 for the second time interval based on the computed channel quality estimate for the second time interval (block 412). In other embodiments, the operations represented by blocks 406-410 may be omitted and the base station 100 may schedule the mobile terminal 100 based on the computed channel quality estimate without comparing the computed channel quality estimate to a reported channel quality estimate.

The present invention allows increases in network capacity, coverage, and end user throughput, thus improving the network resource usage and the overall user experience. Applying extended CQI reporting as described herein makes it possible for the scheduler to respond to fast channel fading since the channel variation component will not be overshadowed by other signal quality variations. By having access to uncontaminated signal strength and interference measurements, the scheduler 120 may more accurately assess the impact of the own-cell and/or other-cell interference in a given TTI, and at least approximate the effect of neighboring cells. While the description of the present invention provides details on exact estimation of the relative interference powers, even indicating a rough structure of the impairment signal will allow significant improvements to be realized by the scheduler, i.e., in order to take advantage of the invention, the relative interference power estimation or reporting does not need to be extremely exact.

The present invention is not limited to the HSDPA context. Any packet data systems relying on CQI feedback from the users may apply the concept of extended CQI reporting to include interference parameters to improve the scheduling accuracy. Further, while the disclosed embodiment of the invention uses a GRAKE receiver, other embodiments of the invention may use a chip equalizer receiver or other type of receiver.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a base station in a wireless network for scheduling transmissions to a mobile terminal over a shared downlink channel, said method comprising;
    receiving from a mobile terminal channel quality feedback including a signal power of a signal received by the mobile terminal from the base station and one or more interference parameters relating to the power of one or more impairment components contributing to the total impairment seen by the mobile terminal during a first time interval;
    determining expected changes in the powers of said impairment components based at least in part on information received from one or more neighboring base stations;
    computing a channel quality estimate for a second time interval subsequent to the first time interval based on the signal power and the expected changes in the powers of said impairment components; and
    scheduling the mobile terminal based on the computed channel quality estimate.

2. The method of claim 1 wherein the channel quality feedback includes component powers for one or more impairment components contributing to the total impairment, and wherein computing the channel quality estimate for the second time interval further comprises computing the channel quality estimate for the second time interval based on the reported component powers.

3. The method of claim 2 wherein the channel quality feedback further includes a power ratio relating the relative power of own cell interference to other cell interference, and wherein computing the channel quality estimate for the second time interval further comprises computing the channel quality estimate for the second time interval based on the reported power ratio.

4. The method of claim 1 wherein the channel quality feedback comprises scaling parameters associated with one or more impairment components, and wherein computing the channel quality estimate for the second time interval further comprises computing the channel quality estimate for the second time interval based on the reported scaling parameters.

5. The method of claim 1 further comprising:
    receiving from a mobile terminal, a reported channel quality estimate for the first time interval;
    determining a variation between the reported channel quality estimate for the first time interval and a previously computed channel quality estimate for the first time interval; and
    using the reported channel quality estimate for the first time interval if the amount of the variation exceeds a predetermined amount.

6. The method of claim 1 further comprising receiving receiver type information indicating interference suppression capabilities of the mobile terminal, and accounting for the interference suppression capabilities of the mobile terminal when computing the channel quality estimate for the second time interval.

7. The method of claim 1 wherein the one or more interference parameters includes a power ratio indicative of the relative powers of own cell and other cell interference.

8. A base station in a wireless communication network comprising:
    a transceiver for transmitting data to a mobile terminal over a shared downlink traffic channel and receiving channel quality feedback from said mobile terminal over an uplink control channel, wherein said channel quality feedback includes a signal power of the signal received by the mobile terminal and one or more interference parameters relating to the power of one or more impairment components contributing to the total impairment in the received signal during a first time interval; and a baseband processor configured to:
- determine expected changes in the powers of said impairment components based at least in part on information received from one or more neighboring base stations;
- compute a channel quality estimate for a second time interval subsequent to the first time interval based on the signal power and the expected changes in the powers of said impairment components; and
- schedule transmission to the mobile terminal over the shared downlink channel based on the computed channel quality estimate.

9. The base station of claim 8 wherein the channel quality feedback includes component powers for one or more impairment components contributing to the total impairment, and wherein the baseband processor is further configured to compute the channel quality estimate for the second time interval based on the reported component powers.

10. The base station of claim 9 wherein the channel quality feedback further includes a power ratio relating the relative power of said own cell interference to other cell interference, and wherein the baseband processor is further configured to compute the channel quality estimate for the second time interval based on the reported power ratio.

11. The base station of claim 8 wherein the channel quality feedback comprises scaling parameters associated with one or more impairment components, and wherein the baseband processor is further configured to compute the channel quality estimate for the second time interval based on the reported scaling parameters.

12. The base station of claim 8 wherein the baseband processor is further configured to:
- determine a variation between the reported channel quality estimate for the first time interval received from the mobile terminal via said transceiver and a previously computed channel quality estimate for the first time interval; and
- use the reported channel quality estimate for the first time interval for scheduling the mobile terminal if the amount of the variation exceeds a predetermined amount.

13. The base station of claim 8 wherein the baseband processor is further configured to compute the channel quality estimate for the second time interval based on receiver type information indicating the interference suppression capabilities of said mobile terminal.

14. The base station of claim 8 wherein the one or more interference parameters include a power ratio indicative of the relative powers of own cell and other cell interference.

* * * * *

UNITED STATES PATENT AND TRADEMARK OFFICE
CERTIFICATE OF CORRECTION

| | |
|---|---|
| PATENT NO. | : 8,233,427 B2 |
| APPLICATION NO. | : 12/392433 |
| DATED | : July 31, 2012 |
| INVENTOR(S) | : Reial et al. |

It is certified that error appears in the above-identified patent and that said Letters Patent is hereby corrected as shown below:

In Column 6, Line 38, delete "LI" and insert -- L1 --, therefor.

In Column 7, Line 37, delete "term" and insert -- term. --, therefor.

In Column 12, Line 6, in Claim 1, delete "comprising;" and insert -- comprising: --, therefor.

Signed and Sealed this
Twenty-seventh Day of November, 2012

David J. Kappos
*Director of the United States Patent and Trademark Office*